United States Patent [19]
Wang

[11] Patent Number: 5,395,154
[45] Date of Patent: Mar. 7, 1995

[54] FOLDABLE BABY CHAIR

[76] Inventor: Sheng-Feng Wang, 3rd Fl., No. 39, lane 54, Lun-Teng St., Taipei, Taiwan, Prov. of China

[21] Appl. No.: 157,998

[22] Filed: Nov. 26, 1993

[51] Int. Cl.[6] .......................... A47D 1/06; B60N 2/28
[52] U.S. Cl. ...................................... 297/130; 280/30; 280/37; 297/17; 297/183.4; 297/256.13; 297/256.15; 297/411.37; 297/487
[58] Field of Search ................ 297/17, 129, 130, 183, 297/250.1, 256.13, 256.15, 363–365, 487, 488, 411.2, 411.32, 411.37, 311.4; 280/30, 37, 643, 648

[56] References Cited

U.S. PATENT DOCUMENTS

| | | | |
|---|---|---|---|
| 1,224,982 | 5/1917 | Washeim | 297/365 |
| 3,248,125 | 4/1966 | Gill | 280/643 X |
| 3,731,342 | 5/1973 | Cousia | 297/365 X |
| 4,113,307 | 9/1978 | Day | 297/183 X |
| 4,302,049 | 11/1981 | Simpson | 297/467 X |
| 4,687,249 | 8/1987 | Mills | 297/184 |
| 4,763,911 | 8/1988 | Gebhard et al. | 297/17 X |
| 4,786,064 | 11/1988 | Baghdasarian | 297/130 X |
| 4,874,203 | 10/1989 | Henley | 297/250.1 |

Primary Examiner—Peter R. Brown
Attorney, Agent, or Firm—W. Wayne Liauh

[57] ABSTRACT

A foldable baby chair comprising a chair back, a chair seat pivotally connected to the chair back via a pivot assembly. The pivot assembly consists of a salient part, a recess part suitable for interfittingly engaging with the salient part, and a positioning assembly, allowing the chair back to be pivot relative to the chair seat and then positioned at a desired inclination by means of the positioning assembly. Substantially inverted U-shaped guard rails are separately connected to the chair back and the chair seat by means of pivot assemblies, so that the inverted U-shaped guard rails are allowed to pivot relative to the chair back or chair seat and can be positioned to different inclinations. Extensible and foldable handle, visor, and footrest can be pivotly connected to the chair back and chair seat, thereby allowing the baby chair to be otherwise used as a baby cart, carry-cot, carryall, suitcase, dining chair, rocking chair, etc. Moreover, the baby chair is provided with a the multihole safety buckle assembly, which can be used in conjunction with a car seat to secure a baby to the car seat.

4 Claims, 7 Drawing Sheets

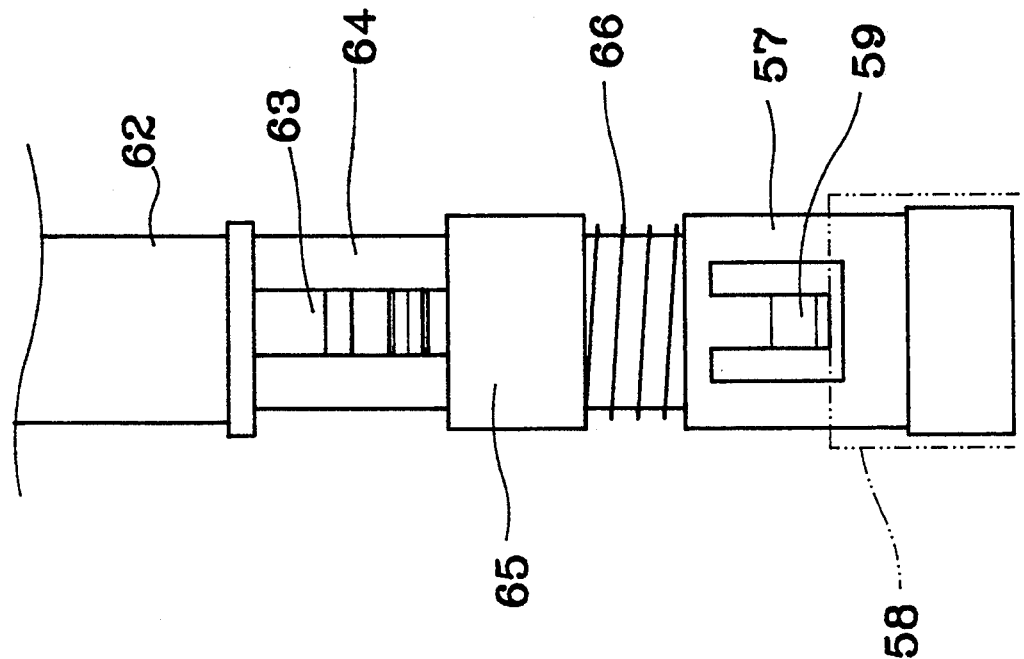
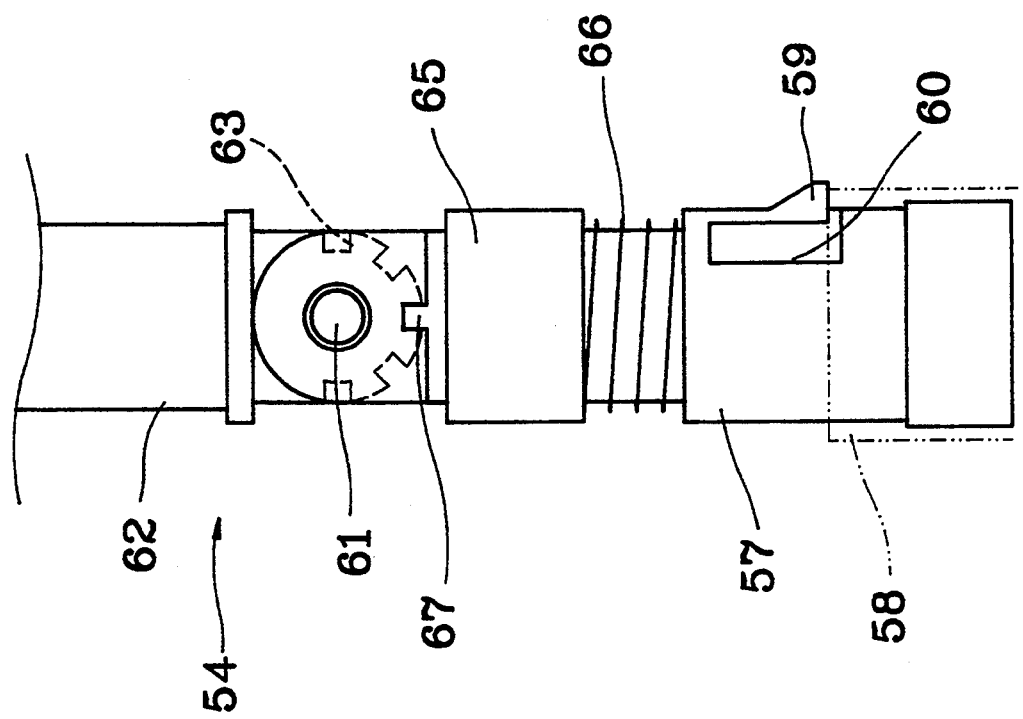

5,395,154

FOLDABLE BABY CHAIR

BACKGROUND OF THE INVENTION

Most of the conventional baby chairs available in the market are L-shaped integrally formed chair back and chair seat. After careful study of such baby chairs, a number of drawbacks can be found which require improvement. The following are some of these drawbacks which exist in the conventional baby chairs:

1. Inconvenient for carrying: Such baby chairs are integrally formed, therefore each chair occupies much room and can not be folded conveniently for carrying when it is to be used outdoors.

2. Poor design: The safety straps of such baby chairs, if any, are usually fixed to the chair back and chair seat and can not be properly adjusted to match different shapes of babies using the chair. An overly loose or tight strap is frequently found which completely loses its function in a baby chair.

3. Limited function: Such conventional baby chairs can be used simply as ordinary chairs without any additional functions.

SUMMARY OF THE INVENTION

The present invention relates to a foldable baby chair comprising a chair back and a chair seat pivotly connected to the chair back by means of a pivot assembly. The pivot assembly consists of a first fixing block having a salient part, a second fixing block having a recess part for interfittingly engaging with the salient part of the first fixing block, and a positioning assembly for fixing the adjusted pivot assembly to a desired position. The pivot assembly allows the chair back to pivotly shifted relative to the chair seat within an angular range of zero to 180 degrees. Thus, the baby chair may be used like a suitcase and be conveniently carried when it is completely folded, or used like a carry-cot when it is completely unfolded. Substantially inverted U-shaped guard rails can be connected to the chair back and chair seat by means of pivot assemblies and thereby can be adjusted to a desirable inclination. The guard rail connected to the chair back is provided with rubber eccentric sleeves so that the room between the two parallel supports of the rail can be adjusted by turning the eccentric sleeves to match the baby's size and shape in the chair and effectively protect the baby. When the guard rails are separately shifted to the rear bottom side of the chair back and the lower front of the chair seat, wheels disposed on the front portion of the guard rails enable the baby chair to be used as a baby cart. When the guard rails are pushed to closely abut against each other with the chair back and chair seat folded relative to each other, they together form the handle of a baby carryall. The chair back and the chair seat are also provided with a plurality of adjustable straps which may be adequately adjusted in all directions depending on the size and shape of the baby in the chair and be secured to a four-hole buckle, for example, attached to one of the straps. Therefore a total of five adjustable straps can be used to safely secure a baby within the chair. The guard rail of the chair back has a retractable front section so that the height of the rail can be freely adjusted by a user to meet different requirements. Springs may be disposed as shock absorbers inside the pipes forming the guard rails. Extensible and foldable pivot assemblies are separately connected to the top end of the chair back and the front end of the chair seat so as to form a handle bar, a visor, or a footrest. A curved and flexible member, such as a rocker, can be fixed to the chair so that the chair can be used as a rocking or spring chair. The baby chair of the present invention can be used as a conveniently portable suitcase when it is folded. It can be used as a baby cart, carry-cot, baby carryall, or safety chair used together with a car seat or a dining chair when it is unfolded to conform to some specific angle between the chair back and the chair seat.

BRIEF DESCRIPTION OF THE DRAWINGS

FIG. 8 is a fragmentary front view of the extensible and foldable pivot assembly used in the present invention;

FIG. 9 is a fragmentary side view of the extensible and foldable pivot assembly of FIG. 8;

FIG. 10 is a perspective of the present invention being used as a suitcase;

DETAILED DESCRIPTION OF THE PREFERRED EMBODIMENTS

Figure 1:
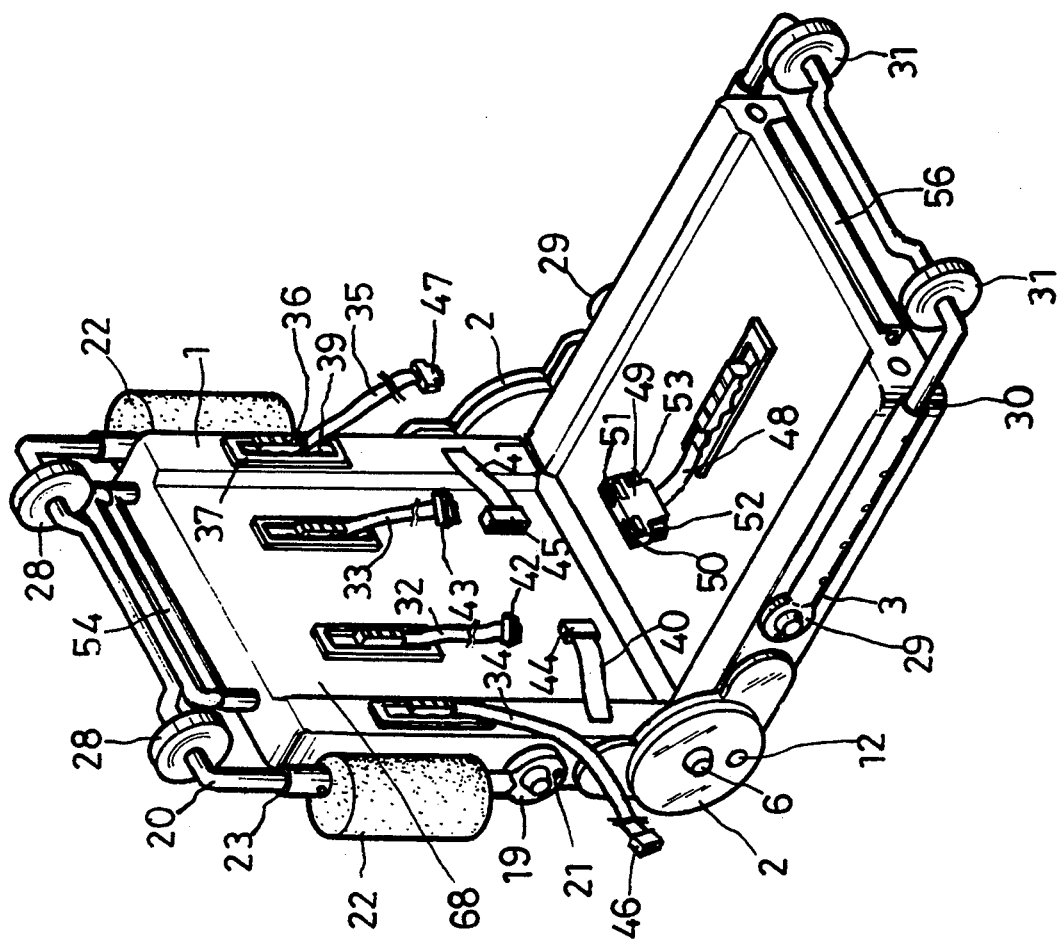
FIG. 1 is a three dimensional perspective of a foldable baby chair according to the present invention.
Figure 2:
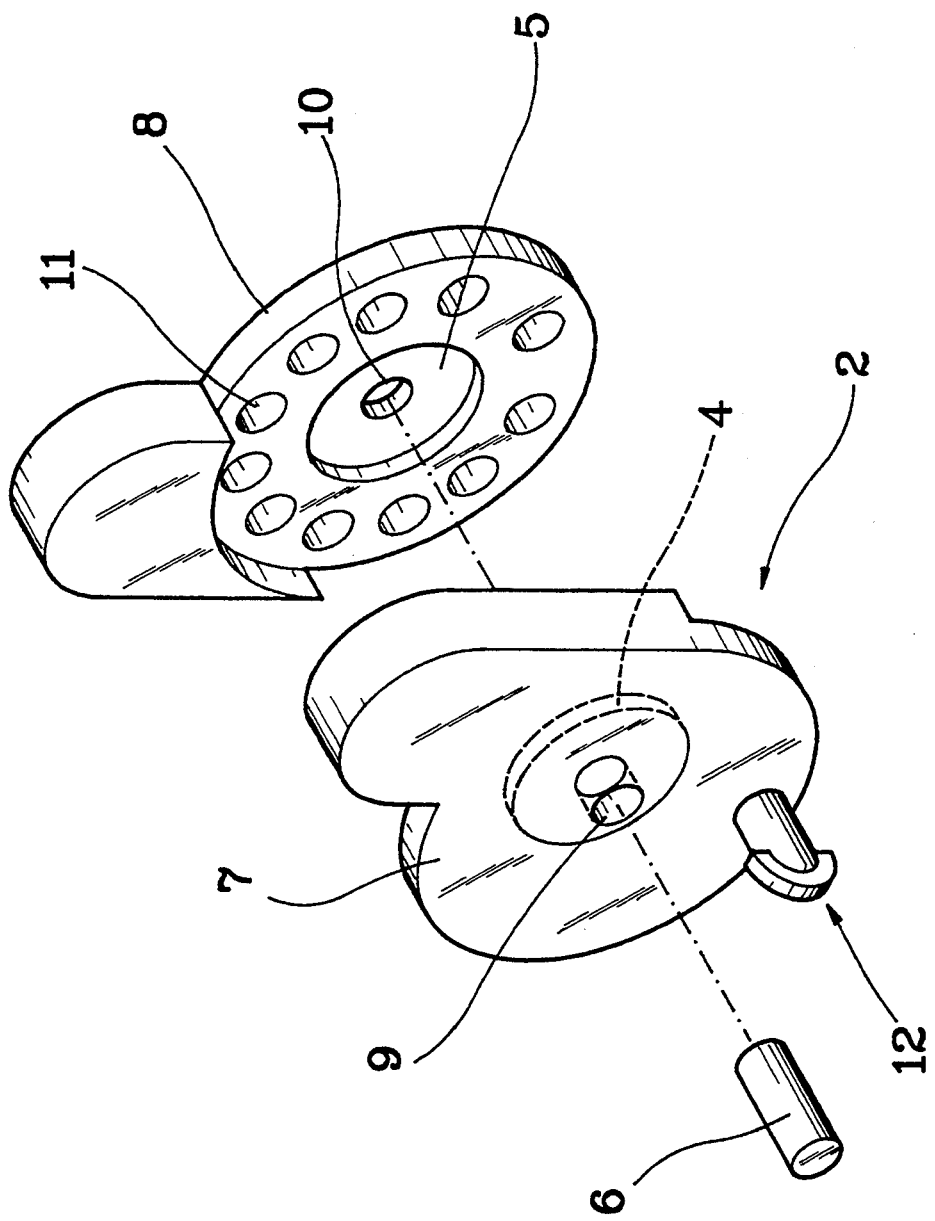
FIG. 2 is an exploded perspective of the pivot assembly of the present invention.
Figures 3, 12:
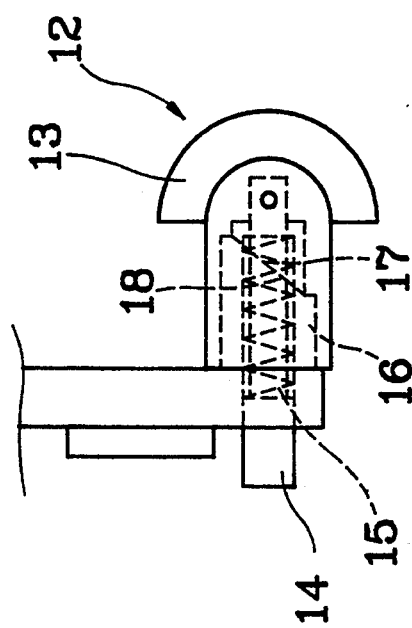
FIG. 3 is a fragmentary sectional view of the pivot assembly, showing the positioning assembly thereof.
FIG. 12 is a side view of the present invention being used as a rocking chair.

Please first refer to FIG. 1 by which a perspective of the present invention is shown, The present invention comprises a chair back 1, a first pivot assembly 2, and a chair seat 3. The first pivot assembly 2 connects the chair back 1 to the chair seat 3, and comprises a first fixing block 7 having a salient part 4 thereon, a second fixing block 8 having a recess part 5 thereon, and a fastening pin 6 associating the first and the second fixing blocks 7, 8 together, as shown in FIG. 2. By means of the engagement of the salient part 4 with the recess part 5, as well as the passing of the fastening pin 6 through pin holes 9, 10 formed on the first and the second fixing blocks 7, 8, respectively, the first fixing block 7 can be turned relative to the second fixing block 8 for an angular adjustment. There are a plurality of equiangularly spaced round holes 11 annularly formed on an inner surface of the second fixing block 8. A first positioning assembly 12 is provided on an outer surface of the first fixing block 7 such that the first positioning assembly 12 would be received by any one of the round holes 11. Referring to FIG. 3, the first positioning assembly 12 consists of a knob 13, pin body 14, and a spring 15, and is fixed to a sleeve 16 formed on the first fixing block 7. By means of the elasticity of the spring 15, the pin body 14 is pushed so that its front end projects into, and is received by, one of the round holes 11, and thereby fixes the first fixing block 7 to the second fixing block 8 at a predetermined relative position. When the knob 13 is turned and contacts bevel sides 17, 18 of the sleeve 16, a wedging action so generated causes the pin body 14 to compress the spring 15 which thereby disengages from the round hole 11 in which the pin body 14 is received. At this point, the first and the second fixing blocks 7, 8, remain in contact with each other by the engagement of the salient part 4 with the recess part 5. Parts 4 and 5, may be turned relative to each other for adjustment purposes. It is to be understood that the above-mentioned embodiment of the present invention as well as the illustrated drawings is a non-limiting example wherein the components can be otherwise shaped and the salient and the recess parts 4, 5 can also be replaced with other similar structures without departing from the scope of the present invention. The first fixing block 7 with the salient part 4 are provided to each side of the chair back 1 at a lower end thereof, and the second fixing block 8 with the recess part 5 are provided on each side of the chair seat 3 at the rear thereof. With the first pivot assembly 2 disposed at the joint of the chair back 1 and the chair seat 3 to pivotly connect them, the chair back 1 and the chair seat 3 can be pivotly shifted relative to each other within an angular range from zero to 180 degrees.

Figure 4:
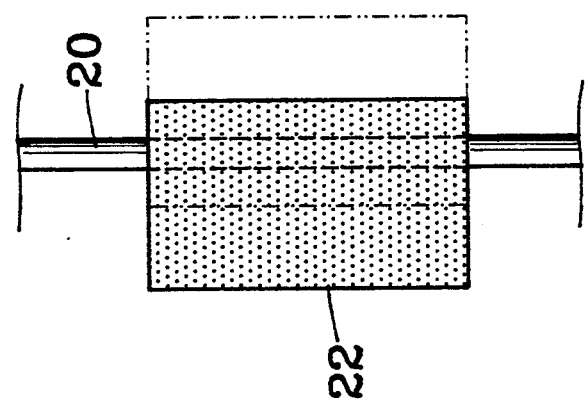
FIG. 4 is a fragmentary sectional view showing the movement of the eccentric sleeve used in the present invention.
Figure 5:
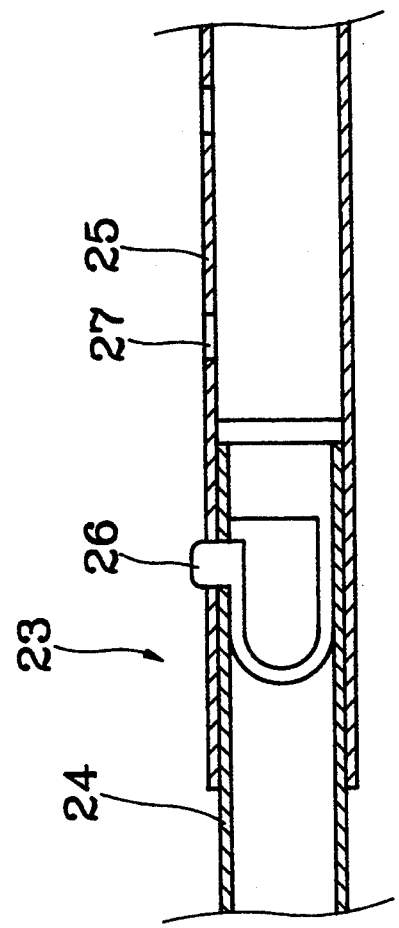
FIG. 5 is a fragmentary sectional view showing the extension sleeve used in the present invention.

A second pivot assembly 19 also being designed with the previously described salient part and recess part but having a size smaller than that of the first pivot assembly 2 is further provided to each side of the chair back 1 to connect a first inverted U-shaped guard rail 20 to the chair back 1. When a second positioning assembly 21 of the pivot assembly 19 is turned loose, the guard rail 20 can be pivotly turned relative to the chair back 1 within an angular range from zero to 360 degrees for adjustment purposes. When the guard rail 20 is turned to a front side of the chair back 1, it functions as a protective means for the baby chair. The two vertical supports of the guard rail 20 are each provided with a rubber-made eccentric sleeve 22, which can be better viewed from FIG. 4. These eccentric sleeves 22 can be rotated clockwise or counter-clockwise to adjust the space between the two vertical supports of the guard rail 20 depending on the actual size and shape of the baby using the chair, so that the eccentric sleeves 22 of the guard rail 20 may fit properly and securely attach and protect the baby's body. An extension sleeve assembly 23 is provided on each vertical support of the guard rail 20 near one end of the eccentric sleeve 22 opposite to the second pivot assembly 19. As better shown in FIG. 5, the extension sleeve assemblies 23 each consist of a small pipe 24, a large pipe 25, and a springing button 26. The small pipe 24 is telescopically fitted into the large pipe 25 for a user to freely adjust its height relative to the large pipe 25. The springing button 26 is disposed inside the small pipe 24 and has a projected portion which is received by a hole 27 formed on the large pipe 25 at a predetermined position and projects out of the hole 27 when the springing button 26 moves along the small pipe 24 to a certain predetermined position. In this way, the small and the large pipes 24, 25 are together fixed to a certain position and the guard rail 20 is adjusted to a desired height. Alternatively, a spring (not shown) may be disposed between the small and the large pipes 24, 25 so that the extension sleeve assemblies 23 may function like shock absorbers. A pair of wheels 28 are disposed on the transverse portion of the guard rail 20 near two outer ends thereof.

A third pivot assembly 29 also having the previously described salient and recessed parts is provided to each side of the chair seat 3 to connect a second inverted U-shaped guard rail 30 thereto. Additionally, a pair of wheels 31 are disposed on the transverse portion of the guard rail 30 near two outer ends thereof. Springs (not shown) can be mounted on the guard rail 30 as shock absorbers.

Figure 6:
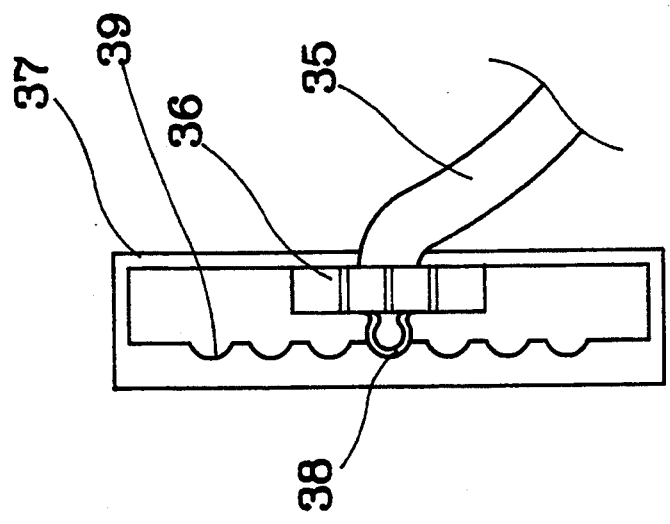
FIG. 6 is a plan view of the adjustable strap used in the present invention.

Adjustable straps 32, 33, 34, 35 are separately provided on the chair back 1 at positions near the upper center and two outer sides thereof. The adjustable straps 32, 33, 34, 35 have the same structure and therefore, only one of them is hereby described in details. As shown in FIG. 6, the adjustable strap 35 has a male button 36 attached to its free end and can slidably move up and down within a female button 37. The male button 36 has a springing click 38 projecting from one side thereof to engage with a vertical line of dents 39, so that the strap 35 may be adjusted in length and in position. Second adjustable straps 40, 41 are further provided to the chair back 1 near two lower outer sides thereof with female buttons 44, 45, respectively, attached to their free ends. The adjustable straps 32, 33 have male buttons 42, 43 attached to their free ends, respectively. The adjustable straps 34, 35 at two outer sides of the chair back 1 have a female button 46 and a male button 47, respectively, attached to their respective free ends. The adjustable straps 34, 35 may be turn backward to the backside of the chair back 1, facilitating the secured positioning of the baby chair of the present invention to a car seat or a dining chair in a restaurant by engaging the male button 46 with the female buttons 47.

Figure 7:
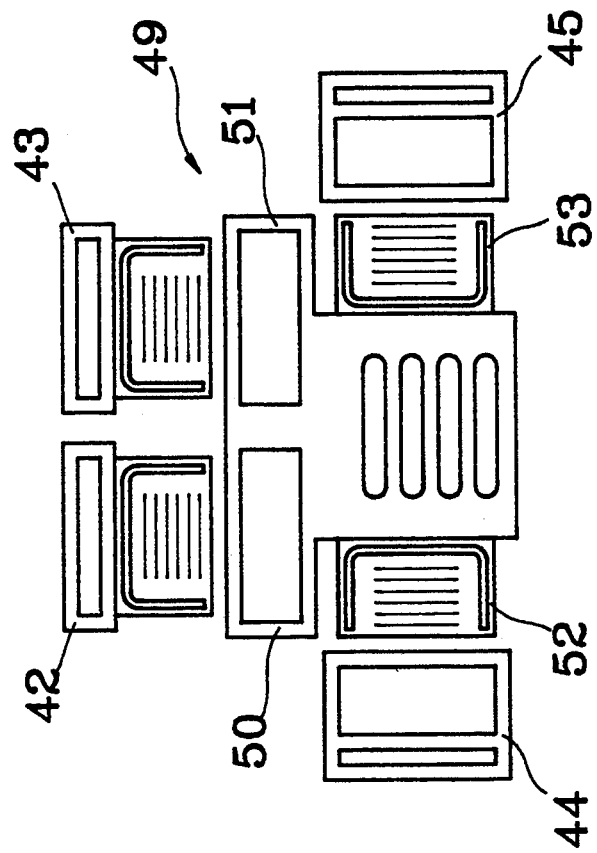
FIG. 7 is a plan view of the multi-hole safety buckle used in the present invention.

A third adjustable strap 48 is provided on a top surface of the chair seat 3 near a middle portion thereof. The strap 48 is provided at one free end a multi-hole safety buckle 49 which is illustrated in FIG. 7. The safety buckle 49 has two female buttons 50, 51 suitable for engaging with the male buttons 42, 43 of the adjustable straps 32, 33, respectively, and two male buttons 52, 53 suitable for engaging with the female buttons 44, 45 of the adjustable straps 40, 41, respectively, so that a baby may be safely secured in the baby chair. Alternatively, the male button 42 may be engaged with the female button 45 while the male button 43 may be engaged with the female button 44, allowing the connected straps 32, 41 to intersect the connected straps 33, 40, forming another securing system. The adjustable straps on the chair back and seat of the present invention can be properly adjusted in all directions to match the size of the baby using the chair. Particularly, the multi-hole safety buckle 49 allows the straps to connect with one another at multiple joints, and thereby safely secure the baby in the baby chair of the present invention. An extensible and foldable handle 54 is provided on a top edge of the chair back 1. In to FIG. 11, on the top end of the handle 54, a foldable visor 55 may be mounted, and, an extensible and foldable footrest 56 can be provided at a front edge of the chair seat 3. The handle 54, the visor 55, and the footrest 56 all have the same extensible and foldable structure and therefore, only the handle 54 is hereby described in details. Referring to FIGS. 8 and 9, the handle 54 is basically an extensible and foldable pivot assembly which comprises two vertical small pipes 57 and two large pipes 58 into which the small pipes 57 are inserted for slidable movement therein. When the small pipe 57 is extended from the large pipe 58 to a certain predetermined extent, a detent plate 59 disposed on the upper portion of the small pipe 57 springs radially outward with its bottom surface bearing against a top end surface of the large pipe 58, preventing the small pipe 57 from moving back into the large pipe 58. The small pipe 57 is extended from and positioned onto the top surface of the large pipe 58. When the detent plate 59 is completely depressed into a slot 60 formed on the small pipe 57 corresponding to the detent plate 59, the small pipe 57 can then retract back to the large pipe 58. A pin 61 is disposed on the upper end of the small pipe 57 to pivotly connect to another small pipe 62, such that the small pipe 62 may be folded toward the small pipe 57 with the pin 61 as a fulcrum. A pivot gear 63 is provided at a lower end of the small pipe 62. It is inserted in a pivot supporting seat 64 on the top end of the small pipe 57 and pivotly supported on the supporting seat 64 by the pin 61. Below the pivot gear 63, there is a fixing block 65 which is normally pushed upward by a spring 66 below it so that a detent 67 projects upwards from the top of the fixing block 65 and engages with the pivot gear 63. When the small pipe 62 is to be folded toward the small pipe 57, the fixing block 65 is first pressed downward to disengage the detent 67 from the pivot gear 63 until the small pipe 62 is pivotly pushed forward or backward to a desired position or inclination. When the depressed fixing block 65 is released, the detent 67 engages with the pivot gear 63 again and thereby fixes the small pipe 62 to a desired inclined position.

Figure 11:
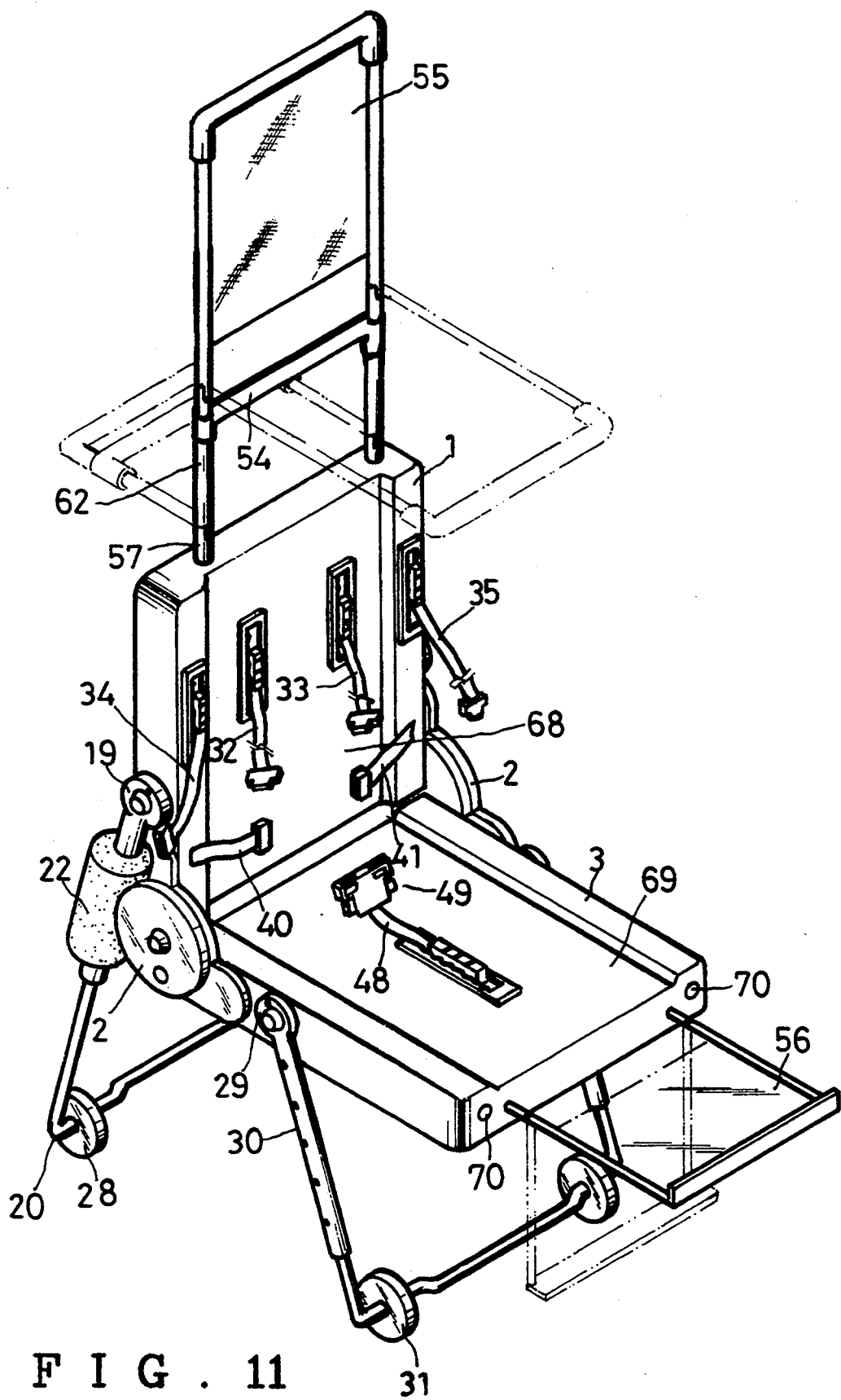
FIG. 11 is a perspective of the present invention being used as a baby cart.

Due to the specially designed pivot assemblies 2, 19, 29, as well as the extensible and foldable pivot assemblies of the handle 54, visor 55, and footrest 56, the present invention has high flexibility in the manner in which it can be assembled and used. Apart from being used as safety baby chair, the present invention can also be folded to form a suitcase which is conveniently portable, as shown in FIG. 10. In another embodiment of the present invention, the chair back 1 and chair seat 3 can be alternatively designed to have a concave surface 68, 69, respectively, to provide additional room between them to accommodate feeding bottles, diapers, etc. As shown in FIG. 11, when the guard rail 20 of the chair back 1 is turned to a rear lower end of the chair back 1 and the guard rail 30 of the chair seat 3 is turned to a lower front of the chair seat 3, the two pairs of wheels 28, 31 disposed in front of the guard rails 20, 30, respectively, enable the baby chair to be used as a baby cart. When the baby chair is folded with the guard rails 20, 30 abutting against each other in front of the chair seat 3, the guard rails 20, 30 together form the handles of a baby carryall, as shown in FIG. 10. In a further embodiment, rocker holes 70 are formed on the chair back 1 or the chair seat 3, as shown in FIG. 11, so that rockers 71 with some extent of flexibility as shown in FIG. 12 can be fitted to the baby chair by inserting the same into the rocker holes 70. This allowing the baby chair to function like a rocking chair or spring chair. With the multi-purpose design and the protective members, such as the rubber eccentric sleeves and the adjustable straps, the foldable baby chair according to the present invention provides babies with a safer, more practical and appropriate seat.

What is claimed is:

1. A foldable baby chair comprising:
    a chair back, a first pivot assembly, and a chair seat pivotally connected to said chair back by means of said first pivot assembly;
    said first pivot assembly being composed of a first fixing block on which a salient part is provided, a second fixing block on which a recess part is provided to interfittingly engage with said salient part of said first fixing block, and a positioning assembly which has a pin body passing through said first fixing block and detachably engaging with one of a plurality of holes formed on said second fixing block and thereby said chair back can be pivotally shifted relative to said chair seat within an angular range from zero to 180 degrees for adjustment purpose and then be desirably positioned by means of said pin body;
    said chair back is provided with a first substantially inverted U-shaped guard rail having a transverse portion and two spaced apart vertical support portions, each of said two vertical portions including an eccentric sleeve means rotatably mounted thereon for adjusting the distance therebetween;
    said first inverted U-shaped guard rail being connected to two side faces of said chair back by a second pivot assembly, which is provided on said side faces of said chair back and is in a spaced apart relationship with said first pivot assembly, said second pivot assembly allowing said first inverted U-shaped guard rail to pivot for an angular adjustment relative to said chair back; and
    said first inverted U-shaped guard rail further being provided with a pair of telescopic sleeve assemblies in said two vertical support portions, respectively, for adjusting the length of said first inverted U-shaped guard rail.

2. A foldable baby chair as claimed in claim 1, wherein said chair seat is further provided with a second substantially inverted U-shaped guard rail, which can be otherwise used as a handle; said second inverted U-shaped guard rail being connected to said chair seat by means of a third pivot assembly, which is provided on two side faces of said chair seat and is in a spaced apart relationship with both said first and second pivot assemblies, said third pivot assembly allowing said second-inverted U-shaped guard rail to pivot for an angular adjustment relative to said chair seat.

3. A foldable baby chair as claimed in claim 1, wherein said chair back and said chair seat are provided with a plurality of first adjustable straps for restraining a baby, and said chair back is further provided with at least one second adjustable strap for attaching said baby chair to a car seat.

4. A foldable baby chair as claimed in claim 1, wherein:
    said chair back is provided with a top handle on top of said chair back and a foldable visor affixed to said top handle to provide shade;
    said chair seat is provided with a footrest at a front edge of said chair seat;
    wherein said top handle includes an extensible and foldable pivot assembly means for mounting said top handle to the chair back and said visor is retractably connected to a top end of said top handle; and said footrest also including an extensible and foldable assembly means similar to said top handle for mounting said footrest to the chair seat.

* * * * *